United States Patent Office 3,282,800
Patented Nov. 1, 1966

3,282,800
PURIFICATION OF α-HALOALKYLATED AROMATICS
John L. Lang, 42 Windgate Drive, Box 820–III, Murrysville, Pa.
No Drawing. Filed Aug. 27, 1965, Ser. No. 483,357
7 Claims. (Cl. 203—6)

This invention relates to the prevention of thermally induced deterioriation of α-haloalkyl aromatic compounds.

More particularly, this invention relates to the stabilization of α-haloalkyl aromatic compounds during physical and chemical manipulations in which these compounds are heated for varying time intervals, e.g., distillation.

This application is a continuation-in-part of copending application Serial No. 210,239, filed July 16, 1962.

Heretofore, the use of such α-haloalkyl aromatic compounds has been limited by the relative instability of these compounds.

There are some instances in the literature and patent art where the problem is dismissed with the blithe statement that such compounds "were distilled" or some equivalent phrase, but the practical accomplishment of the operation, on a commercial or even the laboratory scale, is at least difficult and in some cases verges on impossibility, for all practical purposes. For instance, some of the potentially most useful compounds of this type can be prepared by a most convenient synthesis, known as "chloromethylation," a method described by R. C. Fuson and C. H. McKeever in chapter 3 of volume I of "Organic Reactions," pp. 63–90 incl., published by John Wiley and Sons, Inc., New York (1942) but the full potential of this synthesis has not been realized because of the difficulties occasioned by thermally induced deterioration during distillation.

The industrial as well as the laboratory scale utility of the α-haloalkyl aromatic compounds, prepared by various methods, have been much less than the constituted functionality thereof would indicate, due for the most part to the difficulty in purification of the products due to this instability.

None of the conventional expedients such as the use of short, relatively ineffectual distillation columns, or washing with water, slightly alkaline soutions, degassing or the use of anion exchange resins in the stillpot are effective in preventing the thermally deterioration of α-haloalkylated aromatic compounds.

It is the object of this invention to provide a means for preventing the thermally induced deterioration.

This object and other corollary objects and their accomplishment will become more apparent upon reading the specification and claims of this invention.

It has now been found that α-haloalkylated aromatic compounds can be easily and effectively rendered immune to thermally induced deterioration by the addition of a minor amount of a compound having at least one structural sequence of the type

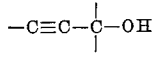

wherein the unoccupied bonds are connected to hydrogen, methylol, or other carbon atoms.

Examples of these acetylenic alcohols which are effective in prevention of thermally induced deterioration of α-haloalkylated aromatic compounds are butyne-1,4-diol, and homologs thereof, 3-butyne-2-ol and homologs thereof, 2-phenyl-1-butyne-3-ol, and homologs thereof, 1-ethynyl-cyclohexanol-1 and homologs thereof, 1-ethynyl-cyclohexenol-1 and homologs thereof, bis(hydroxycyclohexyl) acetylene and homologs thereof; which compounds will be recognized as products of the so-called "ethynylation" synthesis, pioneered by J. Walter Reppe.

These compounds can be added over a wide range of effective concentrations; for most purposes, this varies between 0.005% and 5% by weight, based on the α-haloalkyl aromatic compound.

Although approximate coincidence of boiling point is not required, and in many cases is deliberately avoided when the product must be free of extraneous materials, to obtain maximum effect in the distillation process, the acetylenic-ol compound is selected so as to boil in the same general range or higher than the α-haloalkyl aromatic compound whose stabilization is to be effected.

The α-haloalkyl aromatic compounds whose thermally-induced deterioration can be prevented by addition thereto of an acetylenic alcohol are those having the general formula:

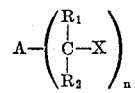

wherein A is an aromatic nucleus or substituted aromatic nucleus, X is chlorine or bromine, $R_1$ and $R_2$ are hydrogen, alkyl groups, derived, substituted or modified alkyl groups, and $n$ is a number from 1 to 3, inclusive.

Examples of such compounds are benzyl chloride, benzyl bromide and their derivatives in which one or more of the hydrogen atoms are replaced by substituents selected from the methyl, ethyl, n-propyl, isopropyl, n-butyl, isobutyl, secondary butyl, tertiary-butyl, vinyl, isopropenyl, allyl, (1-chloromethyl), (1-bromoethyl), (1-chloroethyl), (bromomethyl), (1-chloroisopropyl) and (1-bromoisopropyl) substituents. 1-bromoethyl-benzyl chloride may, for example, comprise at least part of the reaction product resulting from the side-chain bromination of ar-chloromethylated ethyl benzene; ethyl benzyl chloride may comprise at least a part of the reaction product resulting from the ar-chloromethylation of ethyl benzene; vinyl benzyl chloride may comprise at least a part of the dehydrohalogenation product of the side-chain halogenation product of ar-chloromethylated ethyl benzene; and 1-chloroethyl benzyl chloride may comprise at least a part of the reaction product resulting from the side-chain chlorination of ar-chloromethyl ethyl benzene.

The temperature range over which the thermally induced deterioration of these α-haloalkyl aromatic compounds can be prevented by the addition of acetylenic alcohols is a broad one. Stabilization has been successful in the range of 55° C. to 200° C., at sub-atmospheric, atmospheric, and super-atmospheric pressures.

The following examples are given to illustrate the invention, and are not to be construed as limiting the invention in any way.

EXAMPLE I

A sample of ar-chloromethylated ethyl benzene, containing unreacted ethyl benzene, was prepared by the general method described in a chapter by R. C. Fuson and C. H. McKeever in "Organic Reactions," volume I, pp. 63–90 incl., John Wiley and Sons, Inc., New York (1942). The product was washed thoroughly with concentrated calcium chloride solution and ice water, dried with calcium chloride and flash distilled by two separate methods:

A. According to the present invention, using an acetylenic alcohol to prevent thermally induced deterioration, and B. A comparison experiment in which the operations were conducted outside the scope of the invention.

The details of the two portions of the example are:

A. Into a flask containing boiling chips, weighing 343.0 g., was placed 675.5 g. of a mixture containing mainly ethylbenzene and ar-chloromethyl ethylbenzene, plus 2.0 g. of 3-phenyl-1-butyne-3-ol. The flask was assembled as part of an apparatus consisting of a total-takeoff distillation head, condenser, fraction-cutter, product receiver and a vacuum source, to which was fitted a McLeod type manometer, and included a caustic soda pellet trap and a cold trap whose temperature was maintained by surrounding it with carbon dioxide snow. The flask was electrically heated, the voltage to the heater was varied by means of a rheostat.

The distillation was conducted under reduced pressure, which was below 10 mm. Hg pressure. The temperature in the distillation flask and the temperature in the still head was recorded at short time intervals, and when fractions of the product were removed, the internal pressure, the volume distilled, the rheostat setting, the weight of the fraction, the still head temperature and the flask or stillpot temperature were recorded. The apparent specific gravity was calculated and recorded.

These data are given in Table I, in which the pressure of the system has been corrected to 5 mm. Hg, with the corresponding calculated values of the still head temperature by means of a Cox chart. This was done to simplify identification of the thus separated components.

*Table I*

| Cut No. | Head T, °C. Calc. | Pot T, °C. Actual | Overhead Wt., g. | Apparent Sp. Gr. | Remarks |
|---|---|---|---|---|---|
| 1 | | .33 | 20.0 | 0.80 | Unr. Ethyl Benzene. |
| 2 | 18.6 | 33 | 20.2 | 0.81 | Do. |
| 3 | 18.7 | 33 | 20.6 | 0.82 | Do. |
| 4 | 18.7 | 34 | 20.6 | 0.82 | Do. |
| 5 | 18.7 | 34 | 20.0 | 0.80 | Do. |
| 6 | 20.4 | 36.5 | 19.8 | 0.79 | Do. |
| 7 | 20.8 | 37.5 | 20.5 | 0.82 | Do. |
| 8 | 21.8 | 38 | 21.0 | 0.84 | Do. |
| 9 | 21.8 | 37.5 | 14.4 | 0.80 | Do. |
| 10 | 27.0 | 36 | 25.9 | 0.86 | Do. |
| 11 | 28.3 | 35 | 19.8 | 0.79 | Do. |
| 12 | 27.3 | 34.5 | 23.0 | 0.79 | Do. |
| 13 | 29.4 | 34.5 | 20.5 | 0.82 | Do. |
| 14 | 33.1 | 36.0 | 18.2 | 0.73 | Do. |
| 15 | 33.7 | 37.0 | 24.7 | 0.82 | Do. |
| 16 | 35.3 | 39.4 | 24.0 | 0.80 | Do. |
| 17 | 38.9 | 44.6 | 24.9 | 0.83 | Do. |
| 18 | 46.0 | 52.4 | 24.7 | 0.80 | Do. |
| 19 | 57.9 | 60.0 | 15.6 | 0.78 | Do. |
| 20 | 77.8 | 74. | 22.3 | 0.83 | Do. |
| 21 | 76.1 | 71.2 | 28.9 | 0.86 | Do. |
| 22 | 76.2 | 70.6 | 23.4 | 0.98 | Chloromethylated products. |
| 23 | 76.9 | 71 | 29.7 | 0.99 | Do. |
| 24 | 86.6 | 74 | 33.6 | 0.99 | Do. |
| 26 | 108 | 112 | 15.3 | 1.09 | Do. |
| 27 | 144 | 144.5 | 27.2 | 1.05 | Do. |
| 28 | 162.6 | 161 | 4 | | Do. |

Residue, 9.4 g. Cold Trap, 47.2 g. Loss, 9.2 g. Product=159.0÷675.5=23.5%.

B. The identical apparatus of part A was used to distill another 675.5 g. portion of the mixture of mainly ethylbenzene, but in this case, no acetylenic alcohol was added, so operations were conducted outside the scope of the invention, to enable comparison to be made. The distillation data are in Table II, in which the pressure was converted to 5 mm. Hg values, with corresponding still head temperatures, by means of a Cox chart.

*Table II*

| Cut No. | Head T, °C. Calc. | Pot T, °C. Actual | Overhead Wt., g. | Apparent Sp. Gr. | Remarks |
|---|---|---|---|---|---|
| 1 | (¹) | 31 | 21.1 | 0.81 | Mainly Ethylbenzene. |
| 2 | (¹) | 31.5 | 27.0 | | Do. |
| 3 | (¹) | 30 | 18.5 | 0.77 | Do. |
| 4 | (¹) | 31.0 | 25.0 | 0.79 | Do. |
| 5 | (¹) | 31.0 | 25.9 | 0.79 | Do. |
| 6 | (¹) | 31.2 | 28.6 | 0.77 | Do. |
| 7 | 16.0 | 31.6 | 25.0 | 0.77 | Do. |
| 8 | 15.7 | 32.0 | 24.6 | 0.75 | Do. |
| 9 | 16.6 | 32.0 | 24.7 | 0.76 | Do. |
| 10 | 16.3 | 32.2 | 25.0 | 0.77 | Do. |
| 11 | 17.3 | 32.4 | 26.3 | 0.77 | Do. |
| 12 | 17.5 | 32.0 | 27.3 | 0.76 | Do. |
| 13 | 17.5 | 33.6 | 26.4 | 0.76 | Do. |
| 14 | 17.8 | 34.0 | 25.2 | 0.77 | Do. |
| 15 | 18.6 | 36 | 31.1 | 0.79 | Do. |
| 16 | 21.4 | 35.5 | 16.7 | 0.70 | Do. |
| 17 | 31.8 | 34 | 28.4 | 0.77 | Do. |
| 18 | 36.8 | 35 | 24.6 | 0.75 | Do. |
| 19 | 39.8 | 40.0 | 16.5 | | Do. |
| 20 | 47.6 | 45.5 | 6.5 | | Do. |
| 21 | 56.5 | 52.6 | 14.4 | 0.73 | Do. |
| 22 | 72.8 | 58.0 | 19.4 | 0.73 | Do. |
| 23 | 92.1 | 79.2 | 44.0 | 0.94 | Chloromethylated product. |
| 24 | 106.6 | 108 | 38.0 | 0.97 | Do. |
| 25 | 135.9 | 127 | 15.3 | | Do. |

¹ Off the scale.
Product=97.3 (cuts 23-25)/675.5=14.4%.

As can be seen, the use of an acetylenic alcohol has increased the amount of recovered product from 97.3 g. to 159.0 g., or an increase of 63.4% over the technique of the prior art.

EXAMPLE II

In another set of distillations of ethylbenzene-ar-chloromethyl ethylbenzene, in an apparatus similar to that described in Example I except that a 5 section bubble plate column and a fractionating still head was used in place of the flask still total-takeoff head of the previous example. The operation was carried out both in the absence of, and in the presence of acetylenic alcohol, to demonstrate by comparison the resistance to thermally induced deterioration which can be obtained by the use of the teachings of this invention.

A. This part of the experiment was conducted according to the invention.

Into the distillation flask was placed 659.5 g. of ethyl benzene-ar-chloromethylated ethyl benzene reaction mixture, and 0.927 g. of 3-phenyl-1-butyne-3-ol, an acetylenic alcohol. The vacuum distillation was then carried out, recording at short time intervals the internal pressure, still head temperature, distilled (overhead) volume, still-pot temperature, rheostat setting, etc., and when fractions were removed from the system, the volume and weight thereof also recorded, together with other pertinent observations. These data are given in Table III, in which the internal pressure of the system has been corrected to a constant value of 5 mm. Hg pressure by means of a Cox chart to simplify comprehension of the data.

Table III

| Cut No. | Head T, °C. Calc. | Pot T, °C. Actual | Overhead Wt., g. | Apparent Sp. Gr. | Remarks |
|---|---|---|---|---|---|
| 1 | 15.7 | 38.3 | 33.2 | 0.78 | Mainly Ethylbenzene. |
| 2 | 17.9 | 40.0 | 31.7 | 0.77 | Do. |
| 3 | 19.5 | 41.1 | 35.6 | 0.78 | Do. |
| 4 | 16.4 | 41.6 | 33.2 | 0.78 | Do. |
| 5 | 16.5 | 42.8 | 35.2 | 0.77 | Do. |
| 6 | 16.3 | 44.4 | 32.9 | 0.77 | Do. |
| 7 | 16.4 | 46.4 | 32.9 | 0.77 | Do. |
| 8 | 16.5 | 50.1 | 33.2 | 0.78 | Do. |
| 9 | 16.9 | 55.7 | 32.7 | 0.77 | Do. |
| 10 | 18.3 | 62.2 | 33.7 | 0.79 | Do. |
| 11 | 17.6 | 59.2 | 33.6 | 0.79 | Do. |
| 12 | 21.8 | 90.0 | 32.7 | 0.77 | Do. |
| 13 | 35.8 | 96.0 | 1.6 |  | Intermediate. |
| 14 | 76.4 | 97.2 | 33.0 | 1.16 | Chloromethylated product. |
| 15 | 81.1 | 111 | 114.3 | 1.00 | Do. |
| 16 | 95.4 | 153.0 | 24.8 | 0.97 | Do. |
| 17 | 130.6 | 160 | 3.8 |  | Do. |
| 18 | 135.0 | 181 | 18.4 | 0.99 | Do. |

Cold Trap=32.7 g. Residue=17.8 g. Product=194.3 (cuts 14–18, incl.). Recovered 194.3/659.5=29.4%.

B. Using the identical apparatus of part A of this example, but outside the scope of the invention, for purposes of comparison, a distillation was conducted to separate the components of a reaction mixture consisting mainly of ethylbenzene and ar-chloromethylated ethylbenzene. The data obtained are given in Table IV, wherein the internal pressure was corrected to a constant value of 5 mm. Hg pressure as in the previous experiments, and the initial charge was 659.5 g., with no stabilizer added.

Table IV

| Cut No. | Head T, °C. Calc. | Pot T, °C. Actual | Overhead Wt., g. | Apparent Sp. Gr. | Remarks |
|---|---|---|---|---|---|
| 1 | 14.8 | 38 | 24.2 | 0.84 | Mainly Ethylbenzene. |
| 2 | 15.0 | 39 | 24.8 | 0.85 | Do. |
| 3 | 16.1 | 43.5 | 25.6 | 0.83 | Do. |
| 4 | 18.8 | 46.4 | 25.3 | 0.79 | Do. |
| 5 | 17.5 | 47.3 | 27.9 | 0.88 | Do. |
| 6 | 17.4 | 49.0 | 26.8 | 0.85 | Do. |
| 7 | 17.4 | 49.0 | 29.2 | 0.86 | Do. |
| 8 | 16.7 | 50.0 | 29.3 | 0.85 | Do. |
| 9 | 15.6 | 50 | 27.8 | 0.84 | Do. |
| 10 | 16.4 | 51 | 27.7 | 0.84 | Do. |
| 11 | 15.8 | 52 | 27.8 | 0.85 | Do. |
| 12 | 17.8 | 57.0 | 26.6 | 0.86 | Do. |
| 13 | 16.0 | 62 | 23.2 | 0.85 | Do. |
| 14 | 16.2 | 70 | 27.0 | 0.85 | Do. |
| 15 | 14.3 | 101 | 19.5 | 0.84 | Do. |
| 16 | 13.2 | 110.2 | 1.0 |  | Column Removed. |
| 17 | 83.6 | 100 | 21.5 | 1.00 | Chloromethylated product. |
| 18 | 87.0 | 106 | 29.7 | 1.03 | Do. |
| 19 | 90.6 | 112 | 34.2 | 1.04 | Do. |
| 20 | 99.0 | 123 | 33.0 | 1.03 | Do. |
| 21 | 100+ | 123 | 9.8 |  | Do. |

Product=139.6 (cuts 17 through 21). Recovered 128.2/659.5=19.4%.

As can be seen, when the operation is conducted according to the prior art, 128.2 g. of chloromethylated product is obtained, but when an acetylenic alcohol is added in accordance with the present invention, 194.3 g.

of the desired chloromethylated product is obtained, or an increase of 51.6%.

I claim as my invention:

1. A process for the purification of an α-haloalkyl aromatic compound having the general formula:

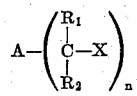

wherein A is a benzene ring in which at least one of the hydrogen atoms is replaced by a substituent selected from the group consisting of the methyl, ethyl, n-propyl, isopropyl, n-butyl, isobutyl, secondary butyl, tertiary butyl, vinyl, isopropenyl, allyl, (1-chloromethyl), (1-bromomethyl), (1-chloroethyl), bromomethyl, (1-chloroisopropyl) and (1-bromoisopropyl) substituents, $R_1$ and $R_2$ are substituents selected from the group consisting of hydrogen and the lower alkyl groups, X is an atom selected from the group consisting of chlorine and bromine, and $n$ is a number from 1 to 3, inclusive; which comprises the steps of mixing with said compound an alcohol selected from the group consisting of butyne-1, 4-diol; homologs of butyne-1, 4-diol; 3-butyne-2-ol; homologs of 3-butyne-2-ol; 1-ethynyl-cyclohexanol-1; homologs of 1-ethynyl-cyclohexanol-1; 1-ethynyl-cyclohexenol-1; homologs of 1-ethynyl-cyclohexenol-1; 3-phenyl-1-butyne-3-ol; homologs of 3-phenyl-1-butyne-3-ol; bis-(hydroxycyclohexyl) acetylene; and homologs of bis(hydroxycyclohexyl) acetylene, the amount of said alcohol being at least an amount effective to prevent thermally induced deterioration of the α-haloalkyl aromatic compound when in the presence of an agent which enhances decomposition, and in the presence of an agent which enhances decomposition, adding heat to the mixture and distilling the same to produce an essentially pure α-haloalkyl aromatic compound.

2. The process of claim 1 wherein the α-haloalkyl aromatic compound comprises at least a part of the reaction product resulting from the side-chain bromination of ar-chloromethylated ethyl benzene.

3. The process of claim 1 wherein the α-haloalkyl aromatic compound comprises at least a part of the reaction product resulting from the ar-chloromethylation of ethyl benzene.

4. The process of claim 1 wherein the α-haloalkyl aromatic compound comprises at least a part of the dehydrohalogenation product of the side-chain halogenation product of ar-chloromethylated ethyl benzene, and wherein the α-haloalkyl aromatic compound is in the presence of a polymerization catalyst.

5. The process of claim 1 wherein the α-haloalkyl aromatic compound comprises at least a part of the reaction product resulting from the side-chain chlorination of ar-chloromethyl ethyl benzene.

6. The process of claim 1 wherein the α-haloalkyl aromatic compound comprises vinyl benzyl chloride.

7. The process of claim 1 wherein the α-haloalkyl aromatic compound comprises vinyl benzyl bromide.

References Cited by the Examiner
UNITED STATES PATENTS

| | | | |
|---|---|---|---|
| 2,603,622 | 7/1952 | Berger et al. | 260—652.5 X |
| 2,775,624 | 12/1956 | Skeeters et al. | 260—652.5 |
| 2,945,895 | 7/1960 | Burch et al. | 260—652.5 |

LEON ZITVER, *Primary Examiner.*

K. V. ROCKEY, *Assistant Examiner.*